Jan. 8, 1952     R. J. NELSEN     2,581,431
RADIOGRAPHIC APPARATUS
Filed Sept. 12, 1949
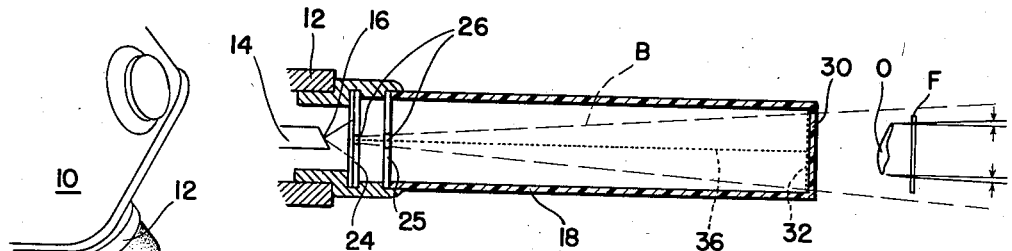
FIG__3
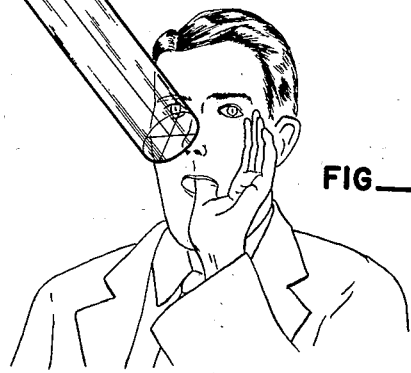
FIG__2
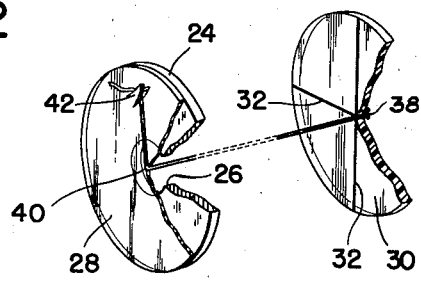
FIG__4
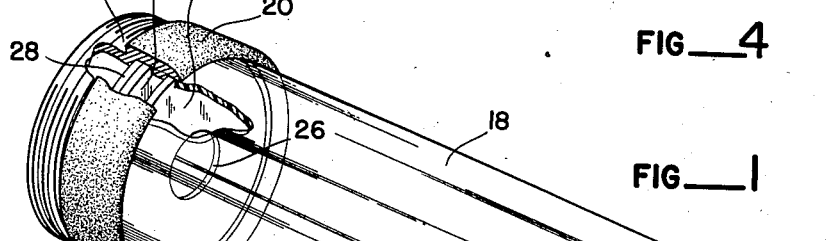
FIG__6     FIG__1
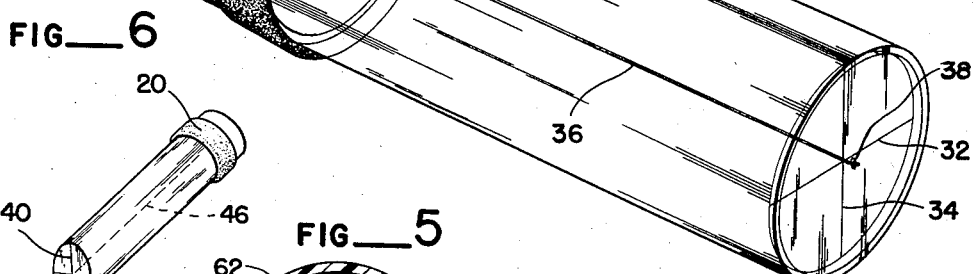
FIG__5
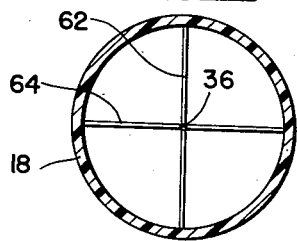
ROBERT J. NELSEN
Inventor
By    Smith & Tuck
Attorneys Patented Jan. 8, 1952

2,581,431

UNITED STATES PATENT OFFICE 2,581,431

RADIOGRAPHIC APPARATUS

Robert J. Nelsen, Seattle, Wash.

Application September 12, 1949, Serial No. 115,191

6 Claims. (Cl. 250—64)

This invention relates to radiographic apparatus and more particularly, pertains to sighting mechanism useful in co-relating X-rays in a beam with an object being examined by such rays. This invention finds usefulness in both the field of anatomical and industrial radiography.

Radiographs, being shadow pictures of an object, are subject to distortion caused by misassociation of the rays and the object due to the former not being arranged with appropriate angulation to the principal plane of the object. The problem is somewhat solved by using a relatively short beam having a substantial flare which insures that the object is suitably exposed to radiation. However the short-flowing beam causes undue enlargement in the resultant shadow as well as subjecting the surrounding area to vagrant rays. An alternate approach calls for a relatively smaller beam of minimum flare so that most of the rays are in a more parallel relationship one to another within the beam. Less geometric distortion of the shadow occurs when a beam having minimum divergence of its rays is employed but more difficulty is encountered in obtaining appropriate angulation between the rays of such a beam and the plane of maximum interest of the object and of the film. Also, such a narrow beam is easily misdirected so that parts of the object can be missed entirely.

The problems of which I speak are particularly prevalent in dental radiography and I shall throughout this specification refer to that field but it is to be understood that my invention has other, such as industrial, applications. I therefore do not intend to limit the application of this invention to dental X-ray technique and equipment.

For the purpose of dental X-ray examinations and similar work most machines are equipped with an extension tube that varies in shape from truncated cones through cylinders to pointed cones. These tubes are used as guides in establishing the focal-spot-object distance and as a rough and inaccurate indicator of the direction of the X-ray beam. Normally they are formed of metal or opaque plastic materials. The longer they are the greater the possibility of there being non-perpendicularity of the axis of the tube and, hence, the axis of the X-ray beam directed out the tube toward the object and the film. When it is borne in mind that a dental X-ray exposure should be rapidly performed for the maximum comfort and convenience of the patient and that the structure of the head of the patient often varies from the norm it is easy to recognize that the X-ray technician can often have substantial error in his radiographs. Such errors are distortions of the shape of the object, undue enlargement, "cone-cutting" of the object and related conditions. The opacity of the tubular extension contributes to these conditions as well as do the practical difficulties the technician has in sighting his beam on the object.

Having in mind these and other considerations, it has been among the principal objects of this invention to provide, for use with conventional X-ray equipment, a tubular extension which, while insuring proper spacing from target to object and film, permits accurate direction of the axis of the X-ray beam with appropriate angulation to the plane of maximum interest of the object; that provides accurate guides in aligning the area of radiation to the area of the object and the film; that is simple and inexpensive to construct; that is adaptable to a wide variety of X-ray machines; and which permits rapid placement of an X-ray source relative an object with high degrees of accuracy by operators of but slight skill.

These and other objects are provided by the apparatus more fully described in the following description which, when read in view of the accompanying drawing, describes in detail a preferred construction embodying my invention.

In the drawing:

Figure 1 is a perspective view, with portions broken away for convenience of illustration, of an X-ray extension tube embodying my invention;

Figure 2 is a sketch illustrating a use of the tube of Figure 1;

Figure 3 is a schematic view showing the advantages of my invention and of apparatus including it;

Figure 4 is a compacted perspective view of certain of the components of my invention;

Figure 5 shows an alternate form of cross-reference lines in my tube; and

Figure 6 illustrates an alternate form of tube.

In the drawings is shown a housing 10 of the type usually employed in connection with dental X-ray apparatus, having a collar 12 about the housing outlet through which passes the beam that emanates from the target or focal spot 16 of the anode 14. The X-rays pass out of the housing through collar 12 when the apparatus is functioning in the production of shadow-graphs.

A transparent extension tube 18, here shown of cylindrical shape as a preferable form, but which may be square or other shape, in cross-section, is mounted to the housing 10 by means of tube collar 20 which has a threaded end portion 22 that fits to the collar 12. The transparent tube 18 is of a length that will establish the desired focal-spot-object-film distance to assure proper delineation of detail of the object. The collar 20 supports X-ray opaque discs or diaphragms 24, 25 which have apertures 26 aligned axially with the central ray of the X-ray beam that passes from the anode 14 into the tube 18. Widely flaring rays are obsorbed by the diaphragms 24, 25 around the apertures so that the relatively narrow beam B is available for use.

Also mounted in collar 20 is filament support disc 28 which is radiolucent and which crosses the collar at its axis. Disc 28 is preferably positioned in juxtaposition to the disc 24 in a non-movable manner in the collar. At the other or outer end of tube 18 is an end-closing disc 30 which is normally cemented in place and which forms the outboard filament support in the device. The last mentioned disc 30 is transparent and radiolucent and carries, in the preferable form of the invention, on its inner faces right-angularly intersecting reference lines 32, 34 which are such that they can be seen from outside the tube. These reference lines may be formed as grooves and usually are filled with opaque material, such as wax or paint, so that they can be readily located.

Alternatively, as shown in Figure 5, the outer reference lines may be visible crossed-filaments 62, 64 which are stretched across the tube so that they intersect at the tube axis. The reference lines on the tube serve to aid the operator in directing the central more parallel beams of the machine by correlating the reference lines of the tube to visible landmarks of the object. For example, in the radiography of the upper second molar the operator merely aligns his horizontal reference line with the ala-tragus line and positions his upright reference line with the vertical line to the lateral corner of the eye. He may then, through the use of the longitudinal axial filament, adjust the direction of the beam with the appropriate angulation.

In Figures 1 and 4 I show a thread-like, visible, radiolucent filament 36 extending between support disc 28 and tube closure disc 30. This filament 36 is knotted at 38 and passes through a small opening in disc 30 into the tube along its axis to pass through an aligned opening 40 in disc 28. Normally the thread 36 is drawn taut and can be anchored in a variety of ways. I have shown in Figure 4 a simple and preferable anchor that is formed by V-slitting the disc 28 and deflecting the tongue 42 thus formed so that the filament can be passed under it. With this arrangement an operator can easily tighten his filament should it tend to sag or be less taut than desirable.

With this apparatus properly mounted on housing 10, the operator locates the device so that the outer end of tube 18 is close to the object being examined and so that the axis of the X-ray beam as designated by filament 36 is in appropriate angulation to the object to be examined. In the case of a human patient and a tooth that is concealed the operator will, of course, have to determine the plane of interest of the object by examining the mouth. His positioning of the beam with that plane will be materially facilitated by filament 36 since he can easily sight along and across it while moving housing 10.

To properly align the apparatus so that his beam includes the desired field of interest the relation of the reference line 32, 34 or 62, 64 to the object are easily observed through the transparent tube during setting of the apparatus.

It has been my experience in practice that this extension tube not only speeds the taking of dental X-ray pictures but it also materially improves their quality over that obtainable with opaque tubes because this apparatus makes it possible to at all times determine just where the beam is directed and its relation to the contours and body of the object to be examined. These advantages are equally available to other applications of X-rays.

Referring to Figure 6, I show the tube 38, having the previously described coupling with collar 20, as being angularly cut at the end so that the reference lines 40 and 42 which are right-angularly arranged relative each other are positioned non-perpendicular to the longitudinal axial filament 46. Such a tube as this will permit angular approaches to a patient as shown in Figure 2 but in such a manner that the upper outer edge of the tube does not contact the patient and, rather, a more planar contact is obtained. The reference lines nevertheless function in the same manner as previously set forth.

While I have shown the preferred embodiment of my invention it will be apparent that changes and alterations may be made within the skill of the normal mechanic. Such are contemplated as are within the spirit and scope of the appended claims.

Having thus described my invention, I claim:

1. Radiographic apparatus for use in connection with a housing enclosing a source of X-rays, comprising: an extension tube for positioning in front of said housing with its longitudinal axis coincident with the axis of the beam of X-rays emanable from said source, means for attaching said tube to said housing, said tube being transparent and having along its longitudinal axis a radiolucent, visible filament extending substantially the length of the tube, and means supporting said filament in said position.

2. The structure according to claim 1 in which there is means forming visible, right-angularly intersecting reference lines at the outer end of said tube and positioned with their intersection coinciding with the axis of said filament and tube.

3. The structure according to claim 2 in which the intersecting reference lines are perpendicular to said filament.

4. The structure according to claim 2 in which the right-angularly intersecting reference lines comprise crossed radiolucent visible filaments each of which spans said tube.

5. Radiographic apparatus for use in connection with a housing enclosing a source of X-rays, comprising: a transparent extension tube for positioning in front of said housing with its longitudinal axis coincident with the axis of the beam of X-rays emanable from said source, means for attaching said tube to said housing, a radiolucent diaphragm across each the outer and inner ends of said tube perpendicular to its axis, a visible radiolucent filament being located in the longitudinal axis of the tube and supported at its ends by said diaphragms, and means forming visible, right-angularly intersecting reference lines on the diaphragm at the outer end of the tube perpendicular to said filament and positioned with the intersection of the reference lines coinciding with said filament and with the tube axis.

6. The structure according to claim 4 in which the longitudinal filament comprises a thread passing through said filament support means and removably anchored thereon.

ROBERT J. NELSEN.

REFERENCES CITED

The following references are of record in the file of this patent:

UNITED STATES PATENTS

| Number | Name | Date |
|---|---|---|
| 1,026,158 | Granger | May 14, 1912 |
| 1,048,433 | Snively | Dec. 24, 1912 |
| 1,164,987 | Bucky | Dec. 12, 1915 |
| 1,753,151 | Israel | Apr. 1, 1930 |
| 1,832,865 | Israel | Nov. 24, 1931 |
| 2,120,729 | Chausse | June 14, 1938 |
| 2,366,430 | Benton | Jan. 2, 1945 |
| 2,436,279 | Wilson | Feb. 17, 1948 |